Oct. 11, 1949.                    W. E. BRADLEY                    2,484,798
                              SIGNAL TRANSMISSION SYSTEM
Filed Dec. 29, 1945                                              2 Sheets-Sheet 1

$d = (2n-1)\frac{\lambda}{4}$, WHERE $n$ IS A POSITIVE INTEGER, AND $\lambda$ IS A FREQUENCY WITHIN BAND B INVENTOR.
WILLIAM E. BRADLEY
BY HIS AGENT
Carl H. Synnestvedt

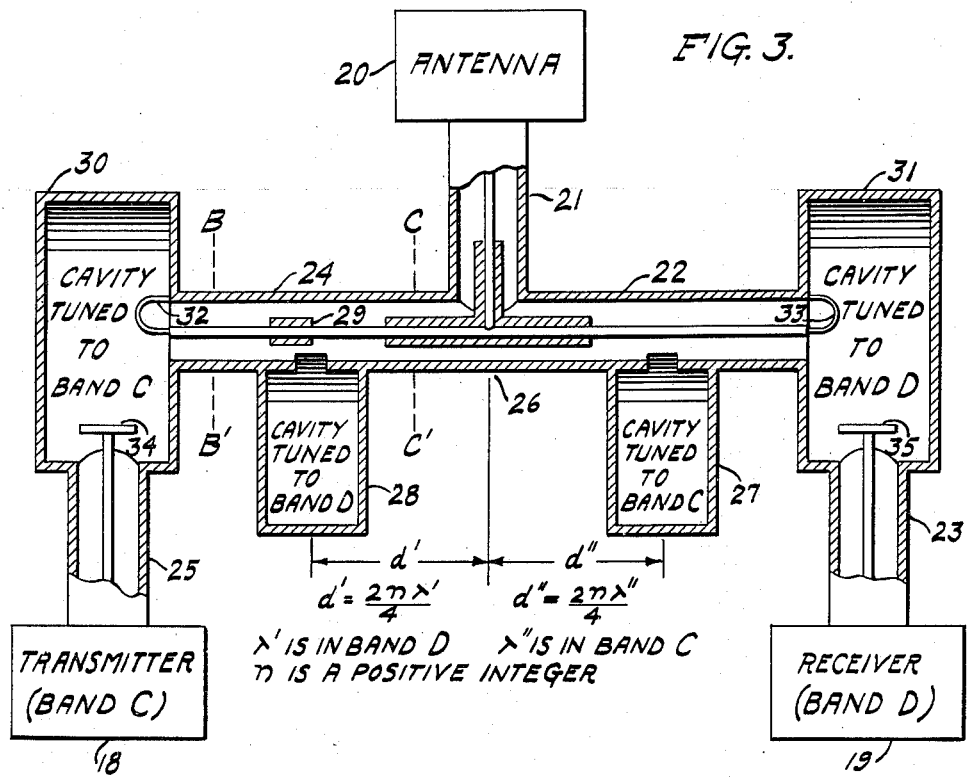
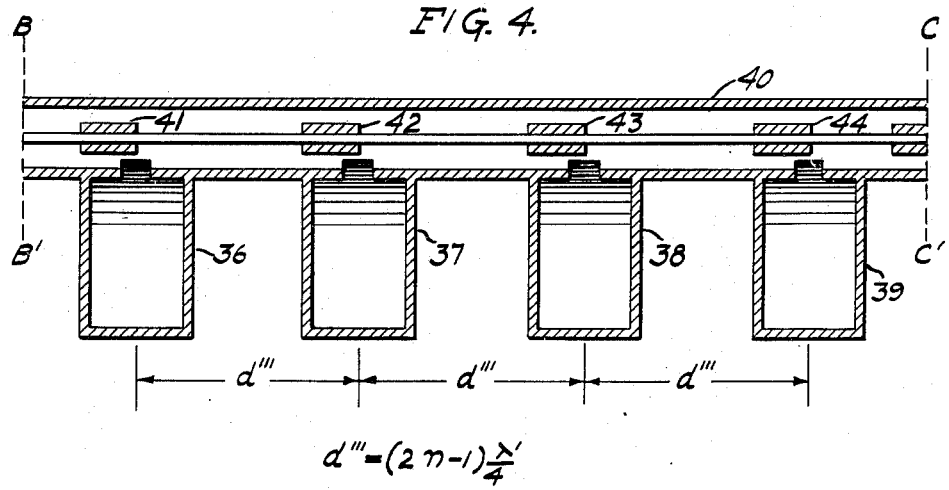

Patented Oct. 11, 1949

2,484,798

UNITED STATES PATENT OFFICE 2,484,798

SIGNAL TRANSMISSION SYSTEM

William E. Bradley, Swarthmore, Pa., assignor, by mesne assignments, to Philco Corporation, Philadelphia, Pa., a corporation of Pennsylvania Application December 29, 1945, Serial No. 637,966

20 Claims. (Cl. 250—6)

This invention relates to signal transmission means particularly adapted for use in the transmission of electric wave signals comprising frequency components in the so-called microwave region of the frequency spectrum. In particular it relates to means by the use of which it is possible for a plurality of signal sources and/or utilization means alternately to be utilized in conjunction with a common antenna, or other common circuits or means, without mutually interfering with the operation of one or another. Still more specifically, in one embodiment of the invention, means are provided whereby a radar set and a communications transmitter-receiver, operating in adjacent regions of the microwave portion of the frequency spectrum may utilize a common antenna without mutually interfering despite the relative proximity of the frequencies on which the two devices operate and despite the great discrepancy in the powers involved.

Means are well known in the art in the form of a resonant transmission line or cavity associated with a spark gap—commonly referred to as a T-R box or switch—for minimizing interference between a radar transmitter and an associated radar receiver operating in the same frequency range. Such means alone, however, are not adequate to prevent interference between two separate systems operating in slightly different frequency ranges but utilizing a common antenna or other common means, particularly when, as is not the case in the instance of a radar transmitter and receiver utilizing the same antenna, both systems may be operating simultaneously.

The principal object of this invention is to provide an electric wave signal transmission system adapted to permit the utilization of a common antenna or other common circuits in conjunction with a plurality of other signal sources and/or other utilization means, each operating in a particular frequency band, while at the same time minimizing the possibility of interference in operation one with the other.

Another object of the invention is to provide such a system incorporating means for excluding from certain of the signal sources and/or utilization means, signal components fortuitously generated in other of said signal sources and/or utilization means at frequencies in the bands within which said certain signal sources normally operate.

Another object of the invention is to provide such a system incorporating means for eliminating or nullifying the undesirable effects of reflection resulting from the incorporation of the exclusion means.

Still another object of the invention is to provide a system whereby a radar set and a communications transceiver, or alternatively a communications transmitter and receiver, operating simultaneously in adjacent frequency bands may be made to utilize a common antenna without mutually interfering.

A further object of the invention is to provide a special insertion piece which may be inserted in the transmission line connecting a radar set with its antenna, and to which a communications transmitter-receiver may also be connected, to provide a system of the sort just described without modification of the radar set.

Other objects and features of the invention will be apparent from the following description and accompanying drawings in which:

Figure 3 is a view showing, in partial cross-section, a system employing another embodiment of the invention; and Figure 4 is a view showing a modification to a portion of the system shown in Figure 3 in accordance with the invention.

Figure 1:
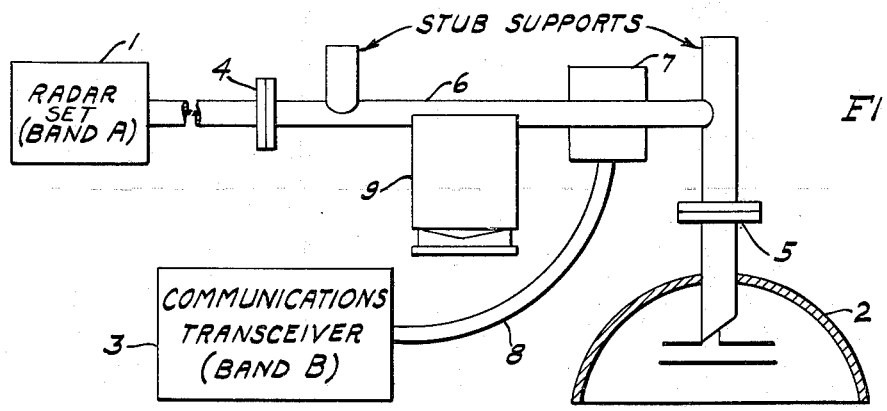
Figure 1 illustrates generally the application of the invention in one of its embodiments in a system in which a radar set and a communications transceiver are arranged to utilize a common antenna.

Referring now to Figure 1, block 1 represents a radar transmitter and receiver of conventional type operating in a frequency band in a microwave region, which is arbitrarily designated band A. This radar set may, incidentally, include the usual transmit-receive switch or T-R box normally used to exclude from the radar receiver the major portion of the energy contained in the transmitted signal which, if it were permitted to enter the receiver circuits, would disrupt them. According to the usual practice, the radar set 1 would be connected directly to an antenna 2 through a suitable length of transmission line or wave guide. In this instance, however, it is desired to have the communications transceiver 3 utilize the same antenna 2 as does the radar set. This transceiver, inasmuch as it is to utilize the same antenna as the radar set, is operated at a frequency which is either slightly above or slightly below that of the radar and which is here arbitrarily designated as band B. In one actual instance, for example, the radar transmitter was operated at a frequency of 3300 megacycles and the communications transceiver at 3350 megacycles. Although the main useful output of the radar set 1 will be at frequencies outside band B, actually in practice there will be a small output of sideband power, some of which will be at frequencies in band B. Hence, if we regard band A as including all of the frequencies in the output from the radar set 1, this band will, at least to some extent, overlap band B.

In accordance with the invention, to make possible utilization of the antenna 2 by radar set 1 and communications transceiver 3, there is inserted between points 4 and 5 in the transmission line connecting the radar set 1 to the antenna 2, a special insertion piece of the general form shown in Figure 1. This piece may be inserted at any convenient point along the length of the radar-to-antenna line and may, if desired, be of such form as to provide a right-angle turn in the line as shown, although this is purely a matter of convenience and not pertinent to the invention. Essentially the insertion piece may consist of a section of stub-supported coaxial transmission line 6 connecting the two ends 4 and 5 of the radar-antenna line. At a convenient point on this line section there is attached a resonant cavity 7 with built in spark gap, commonly referred to as a T-R box, tuned to the transceiver frequency band B. This T-R box is coupled to the line section in conventional manner through a slot or opening of other suitable configuration in the wall of the line section. A connection 8 is also provided from the T-R box 7 to the communications transceiver 3 whereby signals generated in the transceiver are injected through the T-R box 7 into the antenna line and are then supplied to the antenna 2 for space transmission. Likewise signals in band B, intercepted by antenna 2, will be supplied through the T-R box 7 to the transceiver 3 for reception. Also connected to the line section 6, and coupled thereto through a suitable aperture, at a point between the T-R box 7 and the radar set 1, and an odd number of quarter wave-lengths from the T-R box 7 at a frequency within band B, is a resonant blocking cavity 9 tuned to resonate at a frequency within band B.

For satisfactory operation of both the radar set and the transceiver, the following three conditions must be satisfied:

(1) Negligible power must be reflected back to the radar set from the insertion piece at the frequencies within band A which it is desired to transmit to the antenna 2 for radiation into space. It will be recalled that, in this instance, band A has been assumed to include the entire output of the radar set—fortuitously generated sideband components at frequencies within band B, as well as what may be termed the useful output of the radar set. Hence, for efficient operation of the radar set, we need not concern ourselves with reflections of these fortuitously generated sideband components, though in some instances it may be desirable to minimize reflection of them by the insertion piece to avoid interference with the operation of the radar set;

(2) However it is important that any of the fortuitously generated sideband components just referred to, and falling within band B, be excluded from the communications transceiver to avoid interference with the operation of the latter; and (3) Regardless of the length of the line connecting the radar to the insertion piece, and other factors, negligible loss must be introduced between the antenna 2 and the transceiver 3.

In accordance with the invention, and by using the special insertion piece above described, these conditions are satisfied in the following manner. The T-R box 7, the resonant cavity of which is tuned to a frequency in band B, is adapted to provide free transmission in both directions between antenna 2 and communications transceiver 3, of both received and transmitted signals in band B, which will be of relatively low energy level compared to signals originating in the radar set 1. At the same time it will exclude from the transceiver 3, signals outside band B passing from radar set 1 through the insertion piece to antenna 2 for transmission into space, since these signals will be of sufficiently high energy level to break down the spark gap of the T-R box 7. In order to insure that all signals in band B received by antenna 2 shall be delivered to transceiver 3, it is also necessary, in accordance with condition (3), to prevent any such signals from being transmitted through the insertion piece to the radar set 1. This is accomplished by means of the resonant blocking cavity 9. This cavity, being tuned to a frequency in band B, and being disposed at a point on the line section 6 an odd number of quarter wave-lengths from T-R box 7, will effectively open circuit the line section 6, at the point at which T-R box 7 is connected, to signals in band B. Thus it will effectively prevent the transmission of signals in band B through the insertion piece to radar set 1, while at the same time preventing transmission in the opposite direction of sideband components fortuitously generated by the radar set in band B and thereby satisfy condition (3). This will be the case regardless of the length of transmission line connecting the insertion piece to the radar set. Also it should be pointed out that the cavity resonator is particularly adapted to achieve this result. Atlhough at resonance it will, when properly coupled to the line section 6, effectively open circuit the latter, for frequencies in band A which differ only slightly from its resonant frequency, it will behave in quite a different manner and so as to permit substantially full transmission of components in the latter band.

However because of the proximity of band B and the useful transmission band of the radar set (a portion of band A), neither T-R box 7 nor blocking cavity 9 will be far from resonance throughout the useful transmission band of the radar. As a result, some of the useful output of the radar transmitter will be reflected back from the insertion piece unless steps are taken to prevent this. According to the invention, such reflection is eliminated by including in the insertion piece, at a point in the transmission line section 6 near where the resonant cavity 9 is connected, a reactive element which introduces a further reflection which, in effect, cancels out the reflection in the useful portion of band A produced by the T-R box 7 and the blocking cavity 9. This reactive element may take the form of an enlargement of the diameter of the central conductor of the coaxial transmission line section 6 over a portion of its length in the vicinity of the point at which the resonant cavity 9 joins this section. This feature, together with other details of the insertion piece, can more readily be seen by examination of the cross-sectional view of Figures 2 and 2A. Here the reactor 10 will be seen to extend approximately the length of the slot 11 in the outside conductor of the transmission line section 6, which length corresponds to a quarter wave-length of the radar transmitter frequency in the embodiment under discussion. This length proved most satisfactory in practice. However it should be understood that this element may be varied considerably in length and diameter, depending upon the conditions obtaining in the particular system being dealt with, and that in general its optimum dimensions under any given circumstances can best be determined by cut-and-try methods. Furthermore, although in Figure 2 the element 10 is shown centered with respect to the coupling aperture 11, it need not necessarily be so disposed and may be moved to either one side or the other to achieve the best results. In general, according to the invention, the dimensions and position of the reactor 10 should be varied until reflections from the insertion piece at frequencies within band A are minimized.

Figure 2:
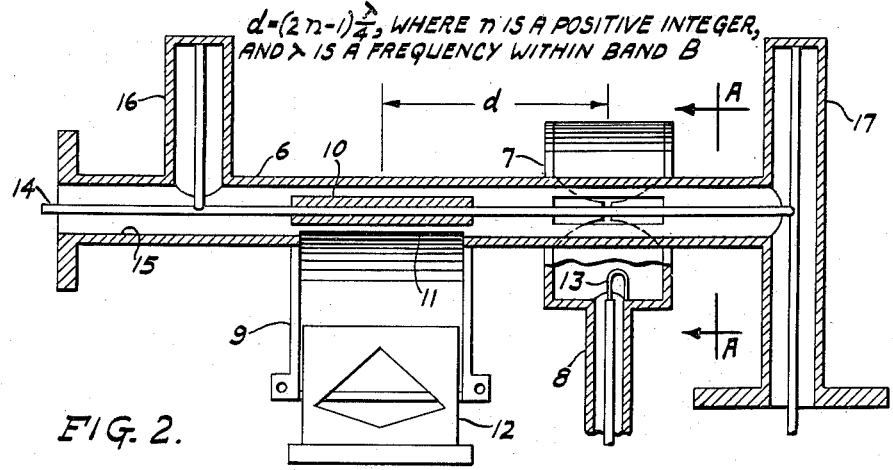
Figure 2 is a view in longitudinal cross-section of the special insertion piece, shown in Figure 1, by which the desired objective of utilizing the common antenna for radar set and communications transceiver is achieved.
Figure 2A:
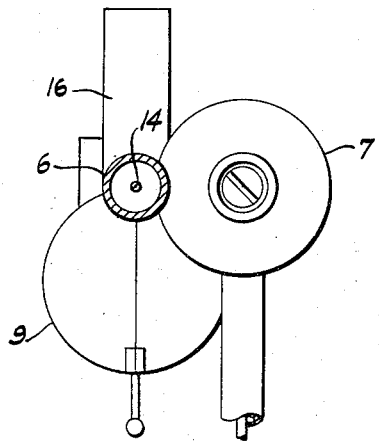
Figure 2A is another cross-sectional view of the insertion piece at plane A—A' in Figure 2.

Further examination of Figure 2 and Figure 2A will serve to bring out additional details of the construction of the insertion piece and some further comments on these details are in order. Although the coupling aperture 11 is shown extending the full width of the blocking cavity 9, it may be desirable, as will be apparent to those skilled in the art, to vary its length or width to secure proper coupling of the cavity to the transmission line section 6. As shown in Figure 2 and in Figure 2A, the cavity 9 may be tunable by means of a "window blind" tuner 12 to the desired frequency in band B. This tuner consists simply of a thin strip of metal inserted into the cavity through a slot in the wall thereof and movable in and out of the cavity to effect a variation in its resonant frequency. It will be noted from the drawings that a specially shaped aperture may be cut in the tuner to obtain the desired rate of variation in tuning as the strip is moved in or out of the cavity.

The T-R box or cavity 7 may be coupled to the transmission line section 6 in substantially the same manner as the blocking cavity 9 and the same remarks apply, regarding the length of the coupling slot or aperture, as made above with reference to the coupling of the blocking cavity 9. It will be noted from Figure 2 that the T-R box need not be connected to the same side of the transmission line section 6 as the blocking cavity 9 but may be attached in whatever position is most convenient provided only that the spacing between the blocking cavity 9 and the T-R box 7 is an odd number of quarter wavelengths at a frequency within band B. A portion of the T-R box has been shown in cross-section, though, as will be apparent, this section is made in a plane different from that of the remainder of the figure. In addition to showing the internal construction of the T-R box, which is conventional, this cross-section shows the manner of coupling by means of the loop 13 to the transmission line 8 leading to the communications transceiver 3 which is shown in Figure 1 but not in Figure 2.

The remainder of the structure of the insertion piece will be obvious from a consideration of Figure 2. The central conductor 14 of the transmission line section 6 being maintained in fixed position with respect to its outer conductor 15 by means of the stub supports 16 and 17 which are well known and require no explanation.

Referring now to Figure 3, in which there is shown, in partial cross section, an alternative embodiment of the invention, the arrangement here shown represents an extension of the general principle, exemplified in the specific embodiment of Figures 1 and 2, to a duplexing system whereby a transmitter and a receiver operating in slightly different frequency bands in the microwave region may utilize the same antenna without mutually interfering. In this drawing, a transmitter 18 operating in band C, a receiver 19 operating in an adjacent band D and an antenna 20 to be used for transmitting signals supplied from the transmitter and for receiving signals intended for the receiver, are interconnected by a structure comprising transmission line sections and resonant cavities arranged as shown. The conditions to be met by this structure are:

(1) Essentially all of the energy contained in signals in band D intercepted by antenna 20 must be delivered to receiver 19 with a minimum of loss to other parts of the system, particularly the transmitter; and (2) Signal energy in band C generated in transmitter 18 should be transmitted directly to antenna 20 and, in particular, such signal energy must be excluded from the receiver circuits 19 in order not to interfere with their operation.

In the system of Figure 3, the most direct route for received signals in band D from antenna 20 to receiver 19 is through transmission line sections 21, 22 and 23, while the most direct route for signals in band C, generated by the transmitter, from transmitter 18 to antenna 20, is through transmission line sections 25, 24 and 21. Sections 22 and 24 may constitute a single section of line joined to section 21 through a T-junction 26 of conventional form as shown. At a point on line section 22, which is an even number of quarter wave-lengths from the T-junction 26 for frequencies in band C, there is attached and coupled to the line section, in accordance with the invention, a resonant cavity 27 tuned to a frequency in band C. At resonance it will effectively open circuit line section 22 to signal frequency components in band C and will therefore exclude from the receiver circuits signals generated by the transmitter in this band, while at the same time allowing free transmission of these signals through line section 21 to antenna 20. On the opposite side of the T-junction, at a point on transmission line section 24 which is an even number of quarter wave-lengths from the T-junction for frequencies in band D, there is likewise disposed and coupled to the line section, in accordance with the invention, a resonant cavity 28 tuned to a frequency in band D. At resonance it will effectively open circuit line section 24 to signal frequency components in band D and will therefore prevent transmission through line section 24 of sideband components fortuitously generated by the transmitter in band D, which might interfere with the operation of receiver 19. At the same time it will confine to line sections 21, 22 and 23 signals intercepted by antenna 20 in this band. As in the case of the embodiment shown in Figure 1 and heretofore described, the introduction of resonant cavity 28 coupled to transmission line section 24 may introduce reflections within band C of signal frequency components generated by the transmitter owing to the fact that the cavity is not sufficiently far from resonance throughout this band. Accordingly it may be desirable to introduce into the transmission line section 24 at a point in the vicinity of the resonant cavity 28, a reactive element 29 to eliminate the effect of such reflections.

Although not essential to the successful operation of the embodiment of the invention shown in Figure 3, it may be desirable to introduce a resonant cavity 30 tuned to a frequency in band C between cavity 28 and transmitter 18. This cavity will serve to improve the transmission of signals in band C from transmitter 18 to antenna 20. Coupling from transmission line section 25 to this cavity may consist of the capacitive element 34, while coupling from the cavity to transmission line section 24 may consist of the loop 32. A similar cavity 31 tuned to a frequency in band D may likewise be introduced between cavity 27 and receiver 19. This cavity will perform a similar function to that performed by cavity 30, but with respect to signals received by antenna 20 in band D and desired to be transmitted to receiver 19. Coupling means 33 and 35, similar to those employed in connection with cavity 30, may be provided for coupling cavity 31 to transmission lines 22 and 23.

It is most important in a system of this sort that sideband components fortuitously generated by the transmitter, in the band in which the receiver normally operates, be excluded from the receiver. Accordingly it may be desirable in accordance with the invention to substitute for the section of the system shown in Figure 3 between lines B—B' and C—C' the alternative section illustrated in Figure 4 and which is adapted to provide a more nearly complete open circuit in line section 24 over the whole of band D than is achievable by the use of the single cavity 28. This alternative section comprises a series of resonant cavities 36, 37, 38 and 39 tuned to frequencies within band D and attached and coupled to a transmission line section 40 at intervals along its length, each corresponding to an odd number of quarter wave-lengths at a frequency within band D. These cavities need not all be tuned to the same frequency but may be tuned to different frequencies within band D so as to give optimum operation over the band. Although four cavities are shown in Figure 4, as many may be used as are needed to obtain the desired result. Again reactive elements as shown at 41, 42, 43 and 44 may be inserted in the transmission line section 40 to eliminate reflections in band C produced by the introduction of the resonant cavities 36, 37, 38 and 39.

Although the invention has been described with particular reference to the embodiments illustrated in the drawings, it will be understood that it is generally applicable to any system in which a plurality of signal sources and/or utilization means are to be operated in conjunction with a common antenna or other common circuits, particularly in the higher ranges of the radio frequency spectrum. It will also be understood that the invention is adapted to forms of physical expression other than those shown, such as will occur to those skilled in the art upon reading this specification. It will, for example, be apparent that, for the coaxial transmission lines shown in the drawings illustrating the various embodiments of the invention, there may be substituted wave-guiding elements of such other forms as may appear desirable for particular applications.

I claim:

1. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, said band being external to said first frequency band; means coupled to said one channel and adapted to exclude from the separate portion thereof signal frequency components in said second frequency band, said means comprising a cavity resonator tuned to resonate at a frequency within said second frequency band; and means coupled to said other channel for substantially confining to said one channel signal frequency components in said first frequency band, said means comprising a cavity resonator tuned to resonate at a frequency within said first frequency band.

2. In an electric wave signal transmission system; channels for the transmission of signals comprising components in different parts of the frequency spectrum, portions of at least some of said channels being common; a source of a signal connected to one of said channels, said signal comprising frequency components in a predetermined first frequency band; a source of a second signal connected to another of said channels, said signal comprising frequency components in a predetermined second frequency band, some of said components being also in said first frequency band; means coupled to said one channel for excluding therefrom components of the signal from said second source external to said first frequency band, said means comprising a cavity resonator tuned to resonate at a frequency within said second frequency band but outside said first frequency band, and means coupled to said other channel for confining to said one channel, signals from said first source, and for excluding therefrom components of the signal from said second source within said first frequency band, said means comprising a cavity resonator tuned to resonate at a frequency within said first frequency band.

3. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, said band being external to said first frequency band; means coupled to said one channel and adapted to exclude from the separate portion thereof signal frequency components in said second frequency band; means coupled to said other channel for substantially confining to said first channel signal frequency components in said first frequency band, said means inadvertently producing reflections at frequencies in said second frequency band; and reactive means included in said other channel for preventing said reflections from reaching said second signal source.

4. In an electric wave signal transmission system; channels for the transmission of signals comprising components in different parts of the frequency spectrum, said channels comprising a plurality of transmission line sections, at least one of said sections constituting a common portion of at least some of said channels; a source of a signal connected to another of said transmission line sections, said signal including frequency components in a predetermined first frequency band; a source of a second signal connected to a third one of said transmission line sections, said signal comprising frequency components in a predetermined second frequency band, said band being external to said first frequency band; means coupled to said other transmission line section and adapted to exclude therefrom signal frequency components in said second frequency band, said means comprising a cavity resonator tuned to resonate at a frequency in said second frequency band; means coupled to said third transmission line section for substantially confining to said other transmission line section signal frequency components in said first frequency band, said means comprising a cavity resonator tuned to resonate at a frequency in said first frequency band and inadvertently producing reflections of signal frequency components in said second frequency band; and means for preventing said reflections from reaching said second signal source, said means comprising a modification in the structure of said third transmission line section over at least a portion of its length in such a way as to change its characteristic impedance over said portion.

5. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, some of said components being also in said first frequency band; means for excluding from the separate portion of said one channel, components of the signal from said second source external to said first frequency band; and means comprising a plurality of cavity resonators each tuned to a frequency within said first frequency band and coupled to said other channel for substantially confining to said one channel signals from said first source and for excluding therefrom components of the signal from said second source within said first frequency band.

6. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, some of said components being also in said first frequency band; means for excluding from the separate portion of said one channel, components of the signal from said second source external to said first frequency band; and means comprising a plurality of cavity resonators each tuned to a frequency within said first frequency band and coupled to said other channel for substantially confining to said one channel signals from said first source and for excluding therefrom components of the signal from said second source within said first frequency band, said cavity resonators inadvertently producing reflections of signal frequency components within said second frequency band; and reactive means included in said other channel and associated with at least some of said cavity resonators for preventing said reflections from reaching said second signal source.

7. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, some of said components being also in said first frequency band; means for excluding from the separate portion of said one channel, components of the signal from said second source external to said first frequency band; means comprising a cavity resonator coupled at least to said one channel for producing a substantially open circuit in the separate portion of said one channel at some frequency within said second frequency band; and means comprising a plurality of cavity resonators coupled at least to said other channel for producing a substantially open circuit in the separate portion of said other channel at a plurality of frequencies within said first frequency band.

8. In an electrical wave signal transmission system; channels for the transmission of signals comprising components in different parts of the frequency spectrum, said channels comprising a first, a second, and a third transmission line section, one end of each of said sections being connected to the other two by a junction means; a source of signal connected to said first transmission line section, said signal including frequency components in a predetermined first frequency band; means connected to said second transmission line section for utilizing a signal comprising frequency components in a predetermined second frequency band, said band being external to said first frequency band; means coupled to said third transmission line section for utilizing signals in said first frequency band and for supplying signals in said second frequency band; means for excluding from said second transmission line section signal frequency components in said first frequency band, said means comprising a cavity resonator tuned to resonate at a frequency in said first frequency band and coupled to said second transmission line section at a point displaced from said junction means by an even number of quarter wave-lengths at a frequency in said second frequency band; means for substantially confining to said second and third transmission line sections signal frequency components in said second frequency band, said means comprising a cavity resonator tuned to resonate at a frequency in said second frequency band and coupled to said first transmission line section at a point displaced from said junction means by an even number of quarter wavelengths at a frequency in said second frequency band.

9. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, said band being external to said first frequency band; means coupled to said one channel and adapted to exclude from the separate portion thereof signal frequency components in said second frequency band, said means comprising a cavity resonator tuned to resonate at a frequency within said second frequency band; means coupled to said other channel for substantially confining to said one channel signal frequency components in said first frequency band, said means comprising a cavity resonator tuned to resonate at a frequency within said first frequency band; means comprising a cavity resonator coupled to said one channel and tuned to resonate at a frequency within said first frequency band for substantially improving the transmission of signals in said band by the separate portion of said one channel; and means comprising a cavity resonator coupled to said other channel and tuned to a frequency in said second frequency band for substantially improving the transmission of signals in said band by the separate portion of said second channel.

10. In an electric wave signal transmission system; channels for the transmission of signals comprising components in different parts of the frequency spectrum, portions of at least some of said channels being common; a transmitter connected to the seperate portion of one of said channels, said transmitter generating frequency components in a predetermined first frequency band; a receiver connected to the seperate portion of another of said channels, said receiver being adapted to receive signals comprising frequency components in a second frequency band, said band being external to said first frequency band; an antenna connected to the common portion of said channels, said antenna being adapted to radiate signals in said first frequency band and to intercept signals in said second frequency band; means coupled to the seperate portion of said other channel and adapted to exclude therefrom signal frequency components in said first frequency band, said means comprising a cavity resonator tuned to resonate at a frequency within said first frequency band; and means coupled to the separate portion of said one channel for substantially confining to said other channel signal frequency components in said second frequency band, said means comprising a cavity resonator tuned to resonate at a frequency within second frequency band.

11. In an electric wave signal transmission system; channels for the transmission of signals comprising components in different parts of the frequency spectrum, portions of at least some of said channels being common; a transmitter connected to the separate portion of one of said channels, said transmitter generating frequency components in a predetermined first frequency band; a receiver connected to the separate portion of another of said channels, said receiver being adapted to receive signals comprising frequency components in a second frequency band, said band being external to said first frequency band; an antenna connected to the common portion of said channels, said antenna being adapted to radiate signals in said first frequency band and to intercept signals in said second frequency band; means coupled to the separate and common portions of both said one and said other channels for excluding, from the separate portion of said other channel, signal frequency components in said first frequency band, said means comprising a T-R box responsive to signals exceeding a predetermined energy level in said first frequency band and incorporating a cavity resonator tuned to a frequency in said second frequency band; and means for substantially confining to said other channel signal frequency components in said second frequency band; said means comprising a cavity resonator coupled to the separate portion of said one channel and tuned to resonate at a frequency in said second frequency band.

12. In an electric wave signal transmission system; channels for the transmission of signals comprising components in different parts of the frequency spectrum, portions of at least some of said channels being common; a transmitter connected to the separate portion of one of said channels, said transmitter generating frequency components in a predetermined first frequency band; a receiver connected to the separate portion of another of said channels, said receiver being adapted to receive signals comprising frequency components in a second frequency band, said band being external to said first frequency band; an antenna connected to the common portion of said channels, said antenna being adapted to radiate signals in said first frequency band and to intercept signals in said second frequency band; means coupled to the separate and common portions of both said one and said other channels for excluding, from the separate portion of said other channel, signal frequency components in said first frequency band, said means comprising a T-R box responsive to signals exceeding a predetermined energy level in said first frequency band and incorporating a cavity resonator tuned to a frequency in said second frequency band; and means for substantially confining to said other channel signal frequency components in said second frequency band; said means comprising a cavity resonator coupled to the separate portion of said one channel and tuned to resonate at a frequency in said second frequency band; both said T-R box and said second-named cavity resonator inadvertently producing reflections at frequencies in said first frequency band; and reactive means included in said one channel for preventing said reflections from reaching said transmitter.

13. An insertion piece for insertion in a radio frequency transmission line connecting a source of electric wave signals in a first frequency band to an antenna system, and adapted to permit the utilization of said antenna system in conjunction with a transceiver for the transmission and reception of electric wave signals in a second frequency band adjacent said first frequency band, said piece comprising a transmission line section, a T-R box coupled to said section, said T-R box incorporating a cavity resonator tuned to resonate at a frequency within said second frequency band and having means for coupling it to a transceiver, and a second cavity resonator coupled to said transmission line section and tuned to resonate at a frequency within said second frequency band.

14. An insertion piece for insertion in a radio frequency transmission line connecting a source of electric wave signals in a first frequency band to an antenna system, and adapted to permit the utilization of said antenna system in conjunction with a transceiver for the transmission and reception of electric wave signals in a second frequency band adjacent said first frequency band, said piece comprising a transmission line section, a T-R box coupled to said section, said T-R box incorporating a cavity resonator tuned to resonate at a frequency within said second frequency band and having means for coupling it to a transceiver, and a second cavity resonator coupled to said transmission line section and tuned to resonate at a frequency within said second frequency band, said T-R box and said second-named cavity resonator being displaced, one from the other, along the length of said transmission line section by an odd number of quarter wave-lengths at a frequency within said second frequency band.

15. In an electric wave signal transmission system; channels for the transmission of signals comprising components in different parts of the frequency spectrum, portions of at least some of said channels being common; a source of a signal connected to one of said channels, said signal including frequency components in a predetermined first frequency band; a source of a second signal connected to another of said channels, said signal comprising frequency components in a predetermined second frequency band, said band being external to said first frequency band; means coupled to said one channel and adapted to exclude from the separate portion thereof signal frequency components in said second frequency band; and means coupled to said other channel for substantially confining to said one channel signal frequency components in said first frequency band, said means comprising a transmission line section and a plurality of cavity resonators, each tuned to a frequency within said first frequency band, coupled to said transmission line section and spaced along the length thereof at intervals corresponding to an odd number of quarter wave-lengths at frequencies within said first frequency band.

16. An insertion piece for insertion in a signal transmission channel for effectively preventing transmission through said channel in a predetermined frequency band, said piece comprising a transmission line section having coupled thereto a plurality of cavity resonators, each tuned to a different frequency within said band, and separated one from another along the length of said line section by intervals corresponding to odd numbers of quarter wave-lengths at frequencies within said band.

17. An insertion piece for insertion in a signal transmission channel for effectively preventing transmission through said channel in a predetermined frequency band, said piece comprising a transmission line section, a cavity resonator coupled to said section and tuned to a frequency within said band, and a reactive element inserted in said section for modifying the transmission characteristics of said insertion piece.

18. In an electric wave signal transmission system; channels for the transmission of signals comprising components in different parts of the frequency spectrum, portions of at least some of said channels being common; a first transmitter connected to the separate portion of one of said channels, said transmitter generating frequency components in a predetermined first frequency band; a second transmitter connected to the separate portion of another of said channels, said transmitter generating frequency components in a predetermined second frequency band and said second band being external to said first band; an antenna connected to the common portion of said channels, said antenna being adapted to radiate signals in both of said frequency bands; a cavity resonator coupled to the separate portion of said one channel and tuned to a frequency within said second frequency band for effectively open-circuiting said channel for frequencies in said second band; and a second cavity resonator coupled to the separate portion of said other channel and tuned to a frequency within said first frequency band for effectively open-circuiting said other channel for frequencies within said first frequency band.

19. In an electrical wave signal transmission system; channels for the transmission of signals comprising components in different parts of the frequency spectrum, portions of at least some of said channels being common; means for supplying to one of said channels a first signal at a relatively low energy level, said signal including frequency components in a predetermined first frequency band; means for supplying to another of said channels a second signal at a relatively higher energy level, said signal comprising frequency components in a predetermined second frequency band, said band being external to said first frequency band; energy level responsive means coupled to said one channel and adapted to exclude said second signal from the separate portion thereof, and means coupled to said other channel for substantially confining to said one channel signal components in said first frequency band, said last-named means comprising a cavity resonator tuned to resonate at a frequency within said first frequency band.

20. An insertion piece for insertion in a signal transmission channel for effectively preventing transmission through said channel in a predetermined frequency band, said piece comprising a wave-guiding element having coupled thereto a plurality of cavity resonators, each tuned to a different frequency within said band, and separated one from another along the length of said wave guiding element by intervals corresponding to odd multiples of quarter wave lengths at frequencies within said band.

WILLIAM E BRADLEY.

REFERENCES CITED

The following references are of record in the file of this patent:

UNITED STATES PATENTS

| Number | Name | Date |
|---|---|---|
| Re. 20,859 | Potter | Sept. 13, 1938 |
| 1,757,114 | Duncan | May 6, 1930 |
| 2,030,179 | Potter | Feb. 11, 1936 |
| 2,202,699 | Leeds | May 28, 1940 |
| 2,202,700 | Leeds | May 28, 1940 |
| 2,258,148 | Schussler | Oct. 7, 1941 |
| 2,281,274 | Dallenbach | Apr. 28, 1942 |
| 2,403,252 | Wheeler | July 2, 1946 |
| 2,403,303 | Richmond | July 2, 1946 |
| 2,408,745 | Espley | Oct. 8, 1946 |
| 2,410,641 | Evans | Nov. 5, 1946 |
| 2,412,315 | Brown | Dec. 10, 1946 |
| 2,416,105 | Lindenblad | Feb. 18, 1947 |
| 2,419,557 | Friis | Apr. 29, 1947 |
| 2,438,367 | Keister | Mar. 23, 1948 |
| 2,439,656 | Hausz | Apr. 13, 1948 |

FOREIGN PATENTS

| Number | Country | Date |
|---|---|---|
| 135,895 | Great Britain | Dec. 11, 1919 |

OTHER REFERENCES

A. W. A. Review, vol. 4, No. 3, 1939, pp. 93–104, Nov. 17, 1939. Copy in Div. 51.

Disclaimer 2,484,798.—*William E. Bradley*, Swarthmore, Pa. SIGNAL TRANSMISSION SYSTEM. Patent dated Oct. 11, 1949. Disclaimer filed Aug. 15, 1950, by the assignee, *Philco Corporation*.
Hereby enters this disclaimer to claim 20 of said patent.
[*Official Gazette September 19, 1950*.]

Disclaimer 2,484,798.—*William E. Bradley*, Swarthmore, Pa. SIGNAL TRANSMISSION SYSTEM. Patent dated Oct. 11, 1949. Disclaimer filed Dec. 21, 1950, by the assignee, *Philco Corporation*.

Hereby disclaims from the scope of claim 16 of the said patent any apparatus in which the transmission line section is a single-conductor wave-guide, said claim being limited hereby to an apparatus in which the transmission line section comprises plural conductors.

[*Official Gazette January 30, 1951.*]